US012248845B2

(12) United States Patent
Agrawal et al.

(10) Patent No.: US 12,248,845 B2
(45) Date of Patent: Mar. 11, 2025

(54) BARCODE DETECTION USING A MULTI-CAMERA SYSTEM

(71) Applicant: Motorola Mobility LLC, Chicago, IL (US)

(72) Inventors: Amit Kumar Agrawal, Bangalore (IN); Hariprasad Shanbhogue Alampady, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/127,350

(22) Filed: Mar. 28, 2023

(65) Prior Publication Data

US 2024/0330628 A1 Oct. 3, 2024

(51) Int. Cl.
*G06K 7/14* (2006.01)
*H04N 23/45* (2023.01)
*H04N 23/55* (2023.01)

(52) U.S. Cl.
CPC .......... *G06K 7/1417* (2013.01); *H04N 23/45* (2023.01); *H04N 23/55* (2023.01)

(58) Field of Classification Search
CPC ....... G06K 7/1417; H04N 23/45; H04K 23/55
USPC ........................................................ 235/494
See application file for complete search history.

(56) References Cited

U.S. PATENT DOCUMENTS

| | | |
|---|---|---|
| 2008/0288403 A1 | 11/2008 | von Mueller |
| 2013/0262309 A1 | 10/2013 | Gadotti |
| 2013/0262315 A1 | 10/2013 | Hruska |
| 2014/0335958 A1 | 11/2014 | Weisman |
| 2015/0206120 A1 | 7/2015 | Murphy et al. |
| 2015/0254698 A1 | 9/2015 | Bondesen et al. |
| 2015/0319138 A1 | 11/2015 | Yan et al. |
| 2017/0249685 A1 | 8/2017 | Mlla |
| 2018/0040150 A1* | 2/2018 | Saporetti ................ H04N 23/90 |
| 2018/0167283 A1* | 6/2018 | Moritomo ......... H04W 12/0431 |
| 2018/0225656 A1 | 8/2018 | Ray et al. |
| 2018/0308117 A1 | 10/2018 | Gupta |
| 2019/0043042 A1 | 2/2019 | Kadam |

(Continued)

OTHER PUBLICATIONS

U.S. Appl. No. 18/127,384, filed Aug. 16, 2023, "Non-Final Office Action", U.S. Appl. No. 18/127,384, filed Aug. 16, 2023, 26 pages.
"Download Microsoft Authenticator", Microsoft Security [retrieved Mar. 15, 2023]. Retrieved from the Internet <https://www.microsoft.com/en-us/security/mobile-authenticator-app?cmp=vgfp7d_40oczofprimaryR3>., 4 Pages.

(Continued)

*Primary Examiner* — Ahshik Kim
(74) *Attorney, Agent, or Firm* — FIG. 1 Patents

(57) ABSTRACT

A computing device includes multiple camera systems each having one or both of a different field of view or a focus range. For example, the computing device may include a telephoto camera system, a wide angle camera system, an ultra-wide angle camera system, and a macro camera system. When a camera application is running, the scenes from each of the multiple cameras are automatically analyzed to determine whether a barcode (e.g., a 1-dimensional barcode or a 2-dimensional barcode, also referred to as a QR code) is included in one of the scenes. If a barcode is included in the scene from a particular camera system, that camera system is selected and one or more actions are taken (e.g., the barcode is displayed by the computing device, information embedded in the barcode is displayed, and so forth).

20 Claims, 9 Drawing Sheets

(56) References Cited

U.S. PATENT DOCUMENTS

| | | |
|---|---|---|
| 2021/0042732 A1 | 2/2021 | Agarwalla |
| 2021/0312217 A1 | 10/2021 | Nater et al. |
| 2021/0312576 A1 | 10/2021 | Clarke |
| 2023/0028859 A1 | 1/2023 | Dewaide |
| 2023/0154148 A1* | 5/2023 | Hada ................ H04N 23/64 382/103 |
| 2023/0224389 A1* | 7/2023 | Hill ................ H04M 1/0262 455/556.1 |
| 2023/0244891 A1 | 8/2023 | Ma et al. |
| 2023/0281887 A1* | 9/2023 | Wesner ............ G06V 30/19013 382/182 |
| 2024/0169060 A1 | 5/2024 | Proff et al. |
| 2024/0330894 A1 | 10/2024 | Agrawal et al. |
| 2024/0331426 A1 | 10/2024 | Agrawal et al. |

OTHER PUBLICATIONS

Agrawal, Amit Kumar, et al., "US Application as Filed", U.S. Appl. No. 18/127,350, filed Mar. 28, 2023, 38 pages.

Agrawal, Amit Kumar, et al., "US Application as Filed", U.S. Appl. No. 18/127,384, filed Mar. 28, 2023, 45 pages.

Agrawal, Amit Kumar, et al., "US Application as Filed", U.S. Appl. No. 18/127,363, filed Mar. 28, 2023, 47 pages.

Rajput, Aditya, "7 best QR Code scanner apps for Android and iOS leading the pack in 2023", Beaconstac Blog [retrieved Mar. 15, 2023]. Retrieved from the Internet <https://blog.beaconstac.com/2019/09/best-qr-code-scanner-apps/>., Jan. 17, 2023, 22 Pages.

U.S. Appl. No. 18/127,384, filed Mar. 6, 2024, "Final Office Action", U.S. Appl. No. 18/127,384, filed Mar. 6, 2024, 22 pages.

U.S. Appl. No. 18/127,384, filed Oct. 15, 2024, "Non-Final Office Action", U.S. Appl. No. 18/127,384, filed Oct. 15, 2024, 25 pages.

* cited by examiner

BARCODE DETECTION USING A MULTI-CAMERA SYSTEM

BACKGROUND

As technology has advanced our uses for computing devices have expanded. One such use is to gather information for the user from a quick response (QR) code. Typically, the user opens a camera application on his or her computing device and moves the computing device around so that the QR code is captured by the computing device. The information in the QR code is then displayed to the user, such as displaying a uniform resource locator (URL) encoded in the QR code. While QR codes are helpful to users, they are not without their problems. One such problem is the amount of time it takes the user to move the computing device so that the QR code is captured by the computing device. These problems can be frustrating for users, leading to user frustration with their devices and camera applications.

BRIEF DESCRIPTION OF THE DRAWINGS

Embodiments of barcode detection using a multi-camera system are described with reference to the following drawings. The same numbers are used throughout the drawings to reference like features and components.

DETAILED DESCRIPTION

Barcode detection using a multi-camera system is discussed herein. Generally, a computing device includes multiple camera systems each having one or both of a different field of view or a focus range. For example, the computing device may include a telephoto camera system, a wide angle camera system, an ultra-wide angle camera system, and a macro camera system. When a camera application is running, the scenes from each of the multiple cameras are automatically analyzed to determine whether a barcode (e.g., a 1-dimensional barcode or a 2-dimensional barcode, also referred to as a QR code) is included in one of the scenes. If a barcode is included in the scene from a particular camera system, that camera system is selected and one or more actions are taken (e.g., the barcode is displayed by the computing device, information embedded in the barcode is displayed, and so forth).

Accordingly, the techniques discussed herein automatically identify which of multiple camera systems can be used to capture a barcode. The user need not expend time or effort trying to determine which camera system has the proper field of view and focus range to scan a barcode, and the computing device need not expend resources (e.g., power) while the user tries to determine which camera system has the proper field of view and focus range to scan a barcode.

Figure 1:
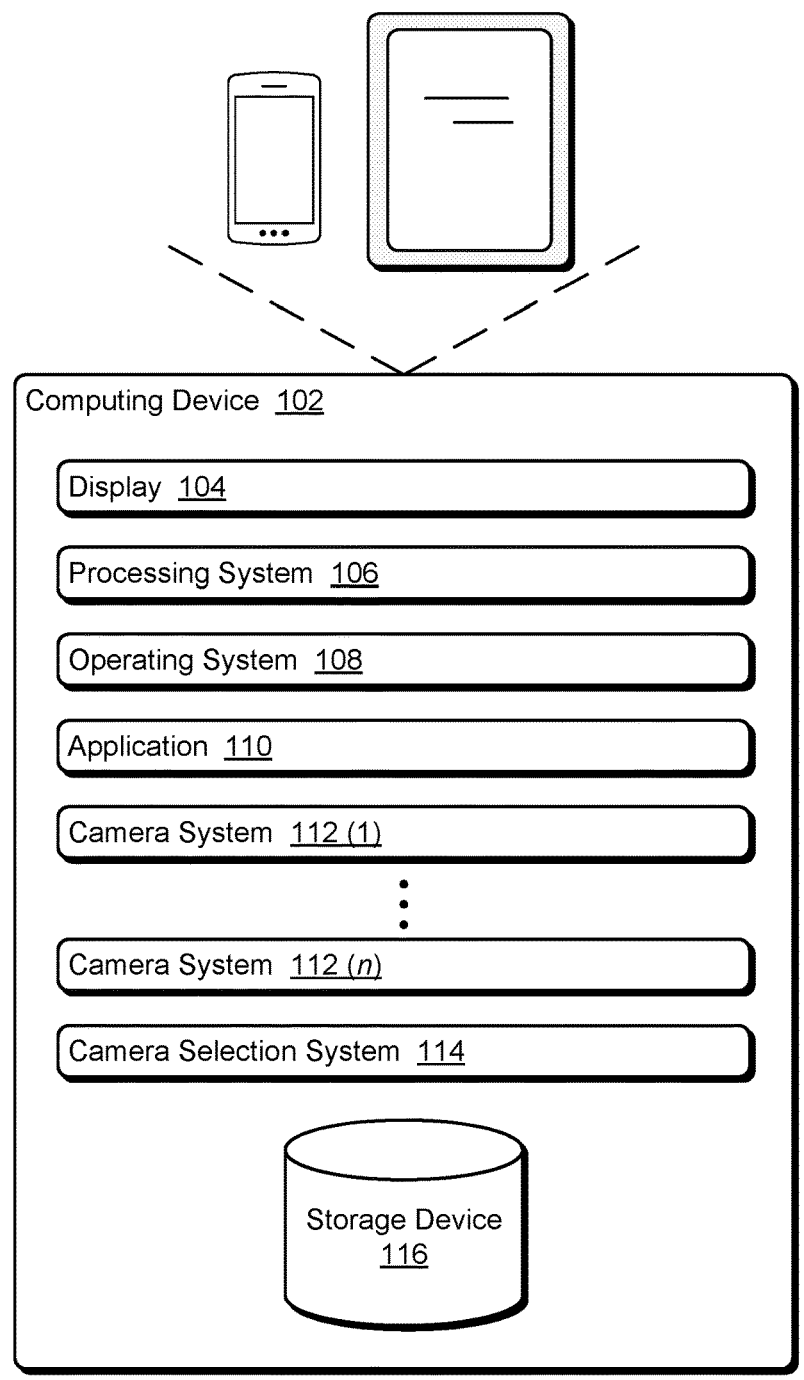
FIG. 1 illustrates an example computing device implementing the techniques discussed herein.

FIG. 1 illustrates an example computing device 102 implementing the techniques discussed herein. The computing device 102 can be, or include, many different types of computing or electronic devices. For example, the computing device 102 can be a smartphone or other wireless phone, a camera (e.g., compact or single-lens reflex), or a tablet or phablet computer. By way of further example, the computing device 102 can be a notebook computer (e.g., netbook or ultrabook), a laptop computer, a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, a fitness tracker, a smart TV, an automotive computer, and so forth.

The computing device 102 includes a display 104, which can be configured as any suitable type of display, such as an organic light-emitting diode (OLED) display, active matrix OLED display, liquid crystal display (LCD), in-plane shifting LCD, projector, and so forth. Although illustrated as part of the computing device 102, it should be noted that the display 104 can be implemented separately from the computing device 102. In such situations, the computing device 102 can communicate with the display 104 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable.

The computing device 102 also includes a processing system 106 that includes one or more processors, each of which can include one or more cores. The processing system 106 is coupled with, and may implement functionalities of, any other components or modules of the computing device 102 that are described herein. In one or more embodiments, the processing system 106 includes a single processor having a single core. Alternatively, the processing system 106 includes a single processor having multiple cores or multiple processors (each having one or more cores).

The computing device 102 also includes an operating system 108. The operating system 108 manages hardware, software, and firmware resources in the computing device 102. The operating system 108 manages one or more applications 110 running on the computing device 102, and operates as an interface between applications 110 and hardware components of the computing device 102.

The computing device 102 also includes multiple (n) camera systems 112 (1), . . . , 112 (n). Each of the camera systems 112 (1), . . . , 112 (n) captures images digitally using a sensor implemented using any of a variety of different technologies, such as a charge-coupled device (CCD) sensor, a complementary metal-oxide-semiconductor (CMOS) sensor, combinations thereof, and so forth. In one or more implementations, each of the camera systems 112 (1), . . . , 112 (n) includes a single sensor and lens. Additionally or alternatively, one or more of the camera systems 112 (1), . . . , 112 (n) may include multiple sensors, multiple lenses, or both multiple sensors and multiple lenses. Each of the camera systems 112 (1), . . . , 112 (n) may have a lens positioned in any of a variety of locations in the computing device 102, such as positioned to capture images from the front of the computing device 102 (e.g., the same surface as the display is positioned on) or from the back of the computing device 102. In one or more implementations, each of the camera systems 112 (1), . . . , 112 (n) includes a sensor (e.g., CCD or CMOS sensor). Additionally or alternatively, one or more of the camera systems 112 (1), . . . , 112 (n) may share a sensor.

In one or more implementations, each of the camera systems 112 (1), 112 (n) senses frames of video, also referred to as preview images or preview frames, at a particular rate (e.g., 60 images or frames per second) that can be displayed on the display 104. The preview frames provide the user an indication of the scene that the camera system 112 will capture and store (e.g., in a local storage device or cloud storage) if requested, such as by user input to the computing device 102 to capture an image (e.g., user selection of a button on the computing device 102).

The computing device 102 also includes a camera selection system 114. The camera selection system 114 selects one of the camera systems 112 (1), . . . , 112 (n) that having one or more preview frames that include a barcode. The camera selection system 114 selects one of the camera systems 112 (1), . . . , 112 (n) by analyzing the preview frames from multiple (e.g., all) of the camera systems 112 (1), . . . , 112 (n) to determine whether a barcode is included in one of the scenes. If a barcode is included in the scene from a particular camera system 112, that camera system 112 is selected and the preview frames from that camera system, including the barcode, are displayed on the display 104.

A barcode refers to a label that encodes data and is optically readable by a machine. A barcode can take any of a variety of forms, such as a 1-dimensional barcode or a 2-dimensional barcode. A 2-dimensional barcode may also be referred to as a QR code.

Each of the operating system 108, application 110, and camera selection system 114 can be implemented in a variety of different manners. For example, each of the operating system 108, application 110, and camera selection system 114 can be implemented as multiple instructions stored on computer-readable storage media and that can be executed by the processing system 106. Additionally or alternatively, each of the operating system 108, application 110, and camera selection system 114 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth). One or more of the operating system 108, application 110, and camera selection system 114 can be implemented in the same manner, or the operating system 108, application 110, and camera selection system 114 can each be implemented in a different manner. Furthermore, although illustrated as separate from the operating system 108, one or both of the application 110 and camera selection system 114 can be implemented at least in part as part of the operating system 108.

The computing device 102 also includes a storage device 116. The storage device 116 can be implemented using any of a variety of storage technologies, such as magnetic disk, optical disc, Flash or other solid state memory, and so forth. The storage device 116 can store various program instructions and data for any one or more of the operating system 108, application 110, and camera selection system 114.

Figure 2:
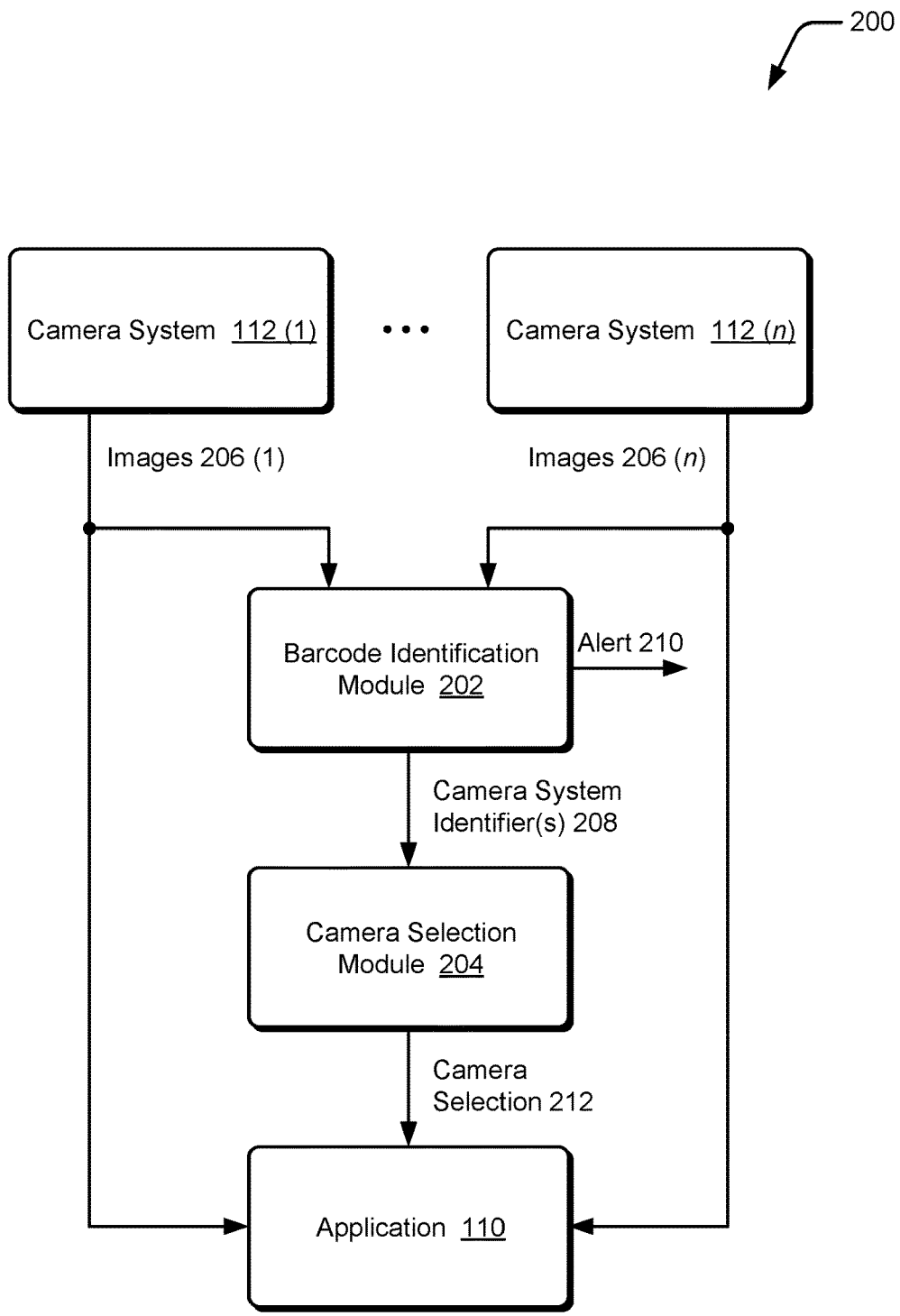
FIG. 2 illustrates an example system implementing the techniques discussed herein.

FIG. 2 illustrates an example system 200 implementing the techniques discussed herein. The system 200 includes multiple camera systems 112 (1), . . . , 112 (n), a barcode identification module 202, a camera selection module 204, and an application 110. In one or more implementations, the barcode identification module 202 and camera selection module 204 are the camera selection system 114 of FIG. 1.

Each camera system 112 can be any of a variety of different types of image capture devices, such as a visible light camera (e.g., capturing images in the 400-700 nanometer (nm) range), an infrared camera (e.g., capturing images in the 1,000-14,000 nm range), and so forth. Additionally, each camera system 112 has an associated focus range and field of view. Examples of camera systems 112 include a tele or telephoto camera system having the smallest field of view, an ultra-wide camera system having the largest field of view, and a wide camera system having a field of view larger than the telephoto camera system but smaller than the ultra-wide camera system. Different ones of the camera systems 112 can have different fields of view and the same focus range, different focus ranges and the same fields of view, or different focus ranges and different fields of view. For example, one of the camera systems 112 can be a macro camera system having a closer focus range than any of the telephoto, wide, or ultra-wide camera systems 112. A macro camera system may be implemented in various manners, such as a camera system 112 that includes a single sensor and lens, another camera system 112 (e.g., an ultra-wide camera system or a telephoto camera system) with macro focus capabilities (e.g., a focal distance of 2 centimeters to infinity), and so forth. Accordingly, two or more camera systems may have the same sensor and lens (e.g., an ultra-wide camera system or a telephoto camera system that can also operate as a macro camera system).

The camera systems 112 (1), . . . , 112 (n) provide images 206 (1), . . . , 206 (n) to the barcode identification module 202. These images 206 (1), . . . , 206 (n) are, for example, preview images as discussed above.

The barcode identification module 202 scans or analyzes the images 206 (1), . . . , 206 (n) to determine whether a barcode is within the field of view of the camera system 112 that captured the images by determining whether any of the images 206 (1), . . . 206 (n) includes a barcode. For a given image, the barcode identification module 202 determines whether the image includes a barcode using any of a variety of public or proprietary techniques. The barcode identification module 202 provides one or more camera system identifiers 208 to the camera selection module 204. Each camera system identifier 208 is an identifier of a camera system 112 (1), . . . , 112 (n) that provided an image 206 to the barcode identification module 202 that included a full barcode.

In one or more implementations, the images 206 (1), . . . , 206 (n) are scanned simultaneously or concurrently. This allows the barcode identification module 202 to quickly identify which of the camera systems 112 (1), . . . , 112 (n) have images that include barcodes. Additionally or alternatively, the images 206 (1), . . . , 206 (n) may be scanned at different timings, such as sequentially.

In one or more implementations, the barcode identification module 202 is able to identify partial barcodes in an image 206. A partial barcode refers to a portion of a barcode (e.g., one-half or three-quarters of a barcode). The information encoded in the partial barcode may not be fully decoded, but the barcode identification module 202 is able to detect that a part of a barcode is present. If the barcode identification module 202 determines that none of the images 206 includes a full barcode, but detects a partial barcode in at least one of the images 206, then the barcode identification module 202 outputs an alert 210 indicating a direction for the computing device 102 to be moved (e.g., one or more of up, down, left, or right) so that the full barcode is within the field of view of at least one of the camera system 112. The barcode identification module 202 can readily determine this direction for the computing device 102 to be moved based on where the partial barcode is in the image 206. For example, if the partial barcode is along the left edge of the image 206 then the barcode identification module 202 determines that the computing device 102 is to be moved to the left. By way of another example, if the partial barcode is along both the top edge and the right edge of the image 206 then the barcode identification module 202 determines that the computing device 102 is to be moved to the right and up.

In one or more implementations, the alert 210 is displayed on the display 104 of the computing device 102. Additionally or alternatively, the alert 210 may be output in other manners, such as audibly by a speaker of the computing device 102. The alert 210 can take any of various forms, such as a flashing arrow pointing in the direction to move the computing device 102, text stating the direction to move the computing device 102, an audio message stating the direction to move the computing device 102, and so forth. In one or more implementations, the alert 210 is output by the camera selection system 114. Additionally or alternatively, the alert 210 is output by another application 110 (e.g., a camera application, a payment processing application, a digital wallet application, etc.) or the operating system 108.

If the barcode identification module 202 determines that at least one of the images 206 includes a full barcode, the camera selection module 204 receives the one or more camera system identifiers 208 and selects one of the camera systems identified by the one or more camera system identifiers 208. In situations where the one or more camera system identifiers 208 identify a single camera system, the camera selection module 204 selects the identified camera system. In situations where the one or more camera system identifiers 208 identify multiple camera systems, the camera selection module 204 applies any of various rules or criteria to select one of the multiple camera systems. For example, the camera selection module 204 may select a default camera system (e.g., whatever camera system is the default camera system when a camera application is opened on the computing device 102, a camera system identified by the user (e.g., as a preference setting)). By way of another example, the camera selection module 204 may select a camera system having the smallest field of view. By way of another example, the camera selection module 204 may select a camera system randomly or pseudorandomly.

The camera selection module 204 outputs, to the application 110, a camera selection 212 that indicates which camera system 112 the camera selection module 204 selected. Although illustrated as application 110, additionally or alternatively the camera selection 212 is output to the operating system 108. In one or more implementations, the camera selection 212 is output to an application that caused the camera selection system 114 to be activated, such as a camera application, a payment processing application, a digital wallet application, and so forth.

Figure 3:
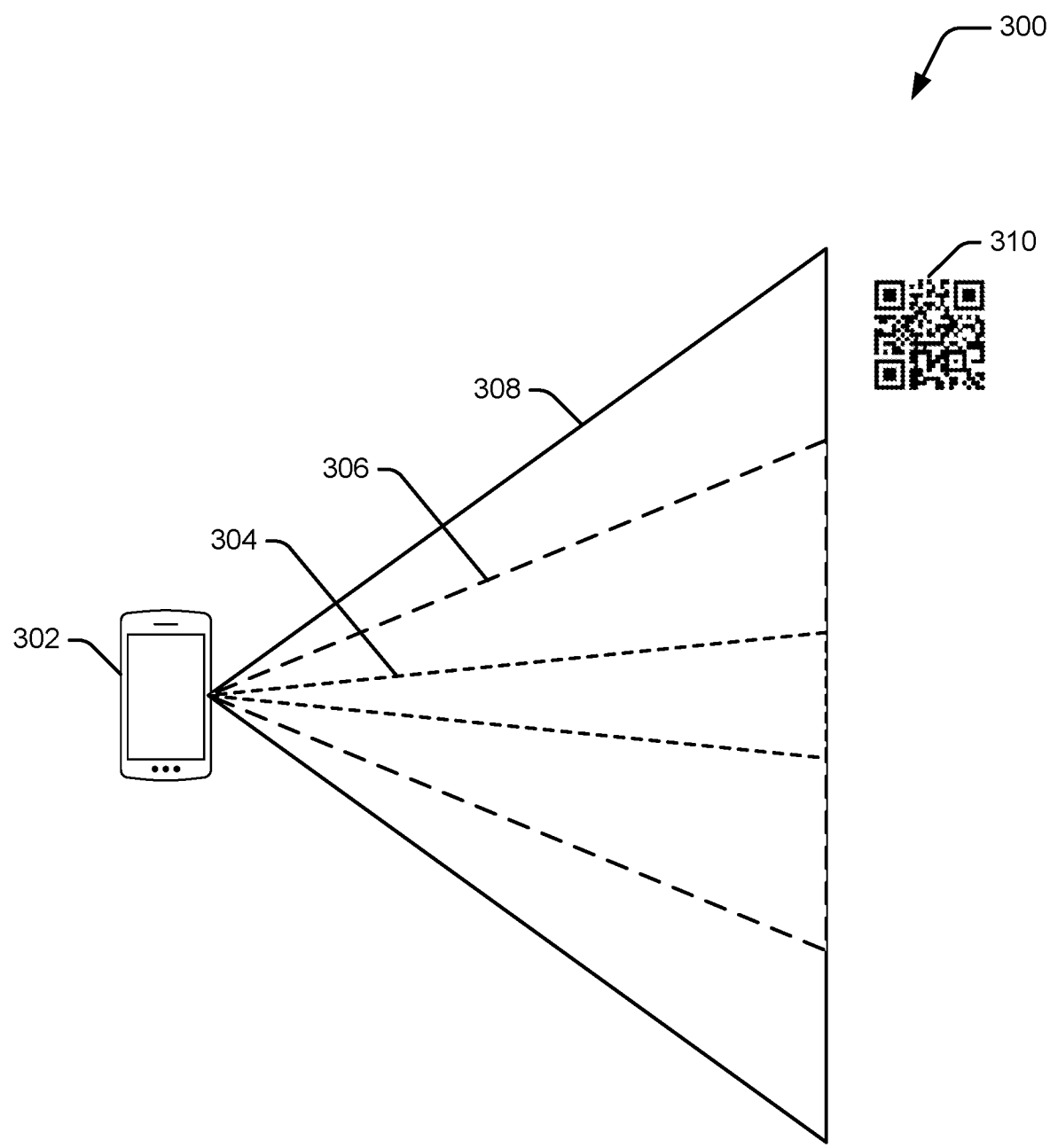
FIGS. 3, 4, 5, and 6 illustrate examples of a computing device implementing the techniques discussed herein.

FIG. 3 illustrates an example 300 of a computing device 302 implementing the techniques discussed herein. The computing device 302 includes a telephoto camera system with a field of view 304 illustrated with short dashed lines, a wide angle camera system with a field of view 306 illustrated with long dashed lines, and an ultra-wide angle camera system with a field of view 308 illustrated with solid lines. A QR code 310 is not within the field of view 304 of the telephoto camera system or the field of view 306 of the wide angle camera system but is within the field of view 308 of the ultra-wide angle camera system. Accordingly, the barcode identification module 202 determines that the ultra-wide angle camera system includes a barcode and the camera selection module 204 selects the ultra-wide camera system.

Figure 4:
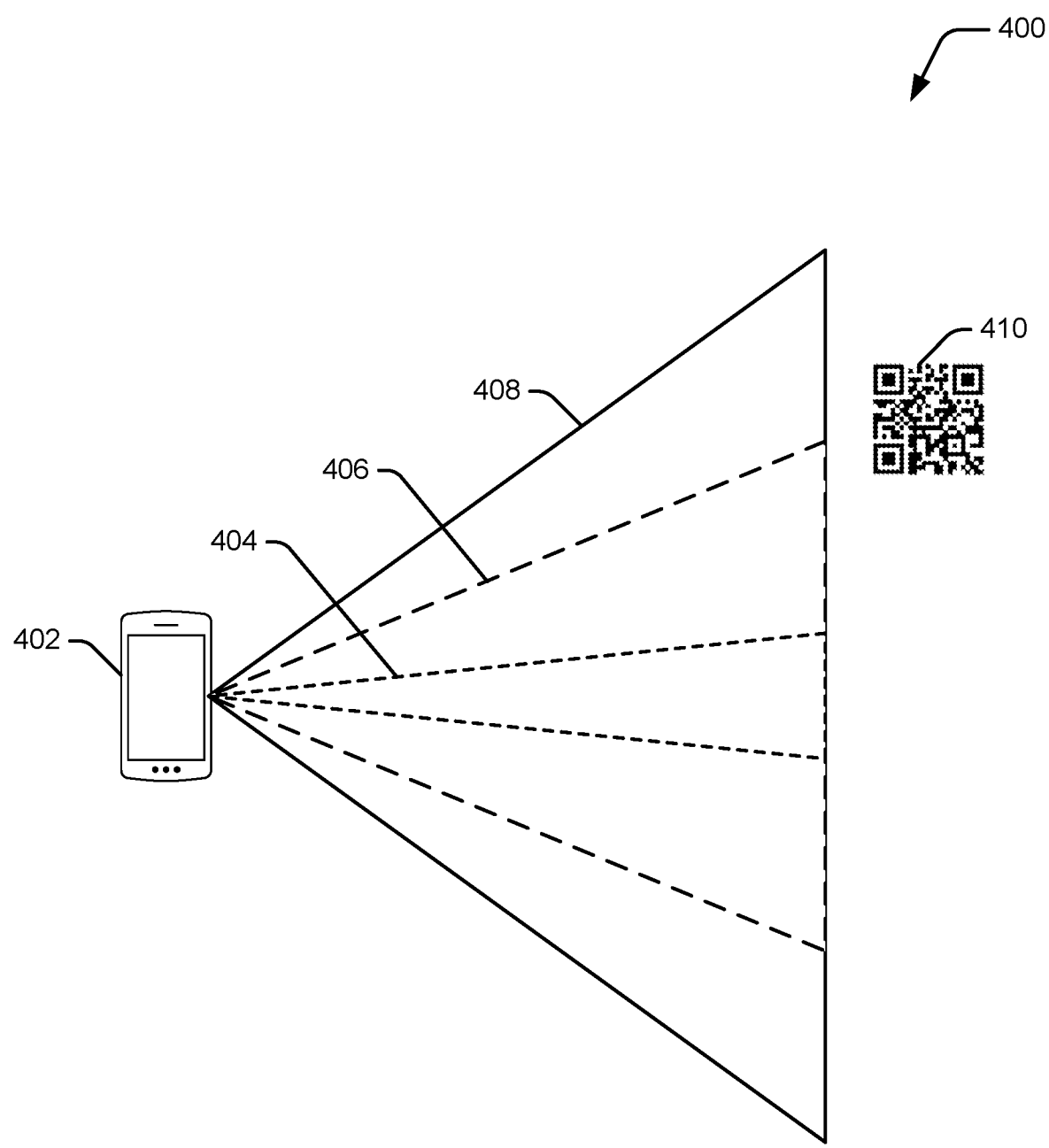

FIG. 4 illustrates an example 400 of a computing device 402 implementing the techniques discussed herein. The computing device 402 includes a telephoto camera system with a field of view 404 illustrated with short dashed lines, a wide angle camera system with a field of view 406 illustrated with long dashed lines, and an ultra-wide angle camera system with a field of view 408 illustrated with solid lines. A QR code 410 is not fully within the field of view 406 of the wide angle camera system or the field of view 404 of the telephoto camera system but is fully within the field of view 408 of the ultra-wide angle camera system. Accordingly, the barcode identification module 202 determines that the ultra-wide angle camera system includes a barcode and the camera selection module 204 selects the ultra-wide camera system.

Figure 5:
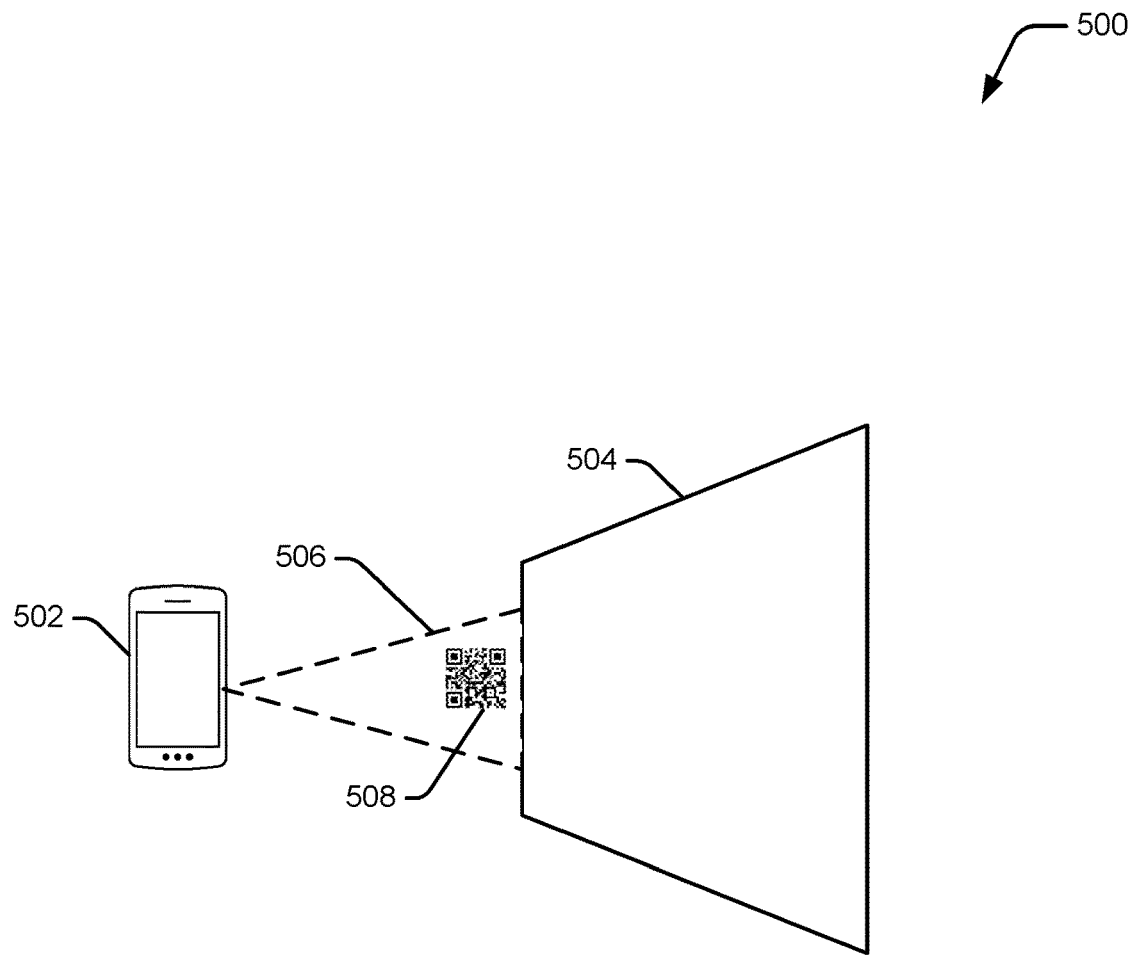

FIG. 5 illustrates an example 500 of a computing device 502 implementing the techniques discussed herein. The computing device 502 includes a telephoto camera system with a focus range 504 illustrated with solid lines, and a macro camera system with a focus range 506 illustrated with dashed lines. A QR code 508 is not within the focus range 504 of the telephoto camera system but is fully within the focus range 506 of the macro camera system. Accordingly, the barcode identification module 202 determines that the macro camera system includes a barcode and the camera selection module 204 selects the macro camera system.

Figure 6:
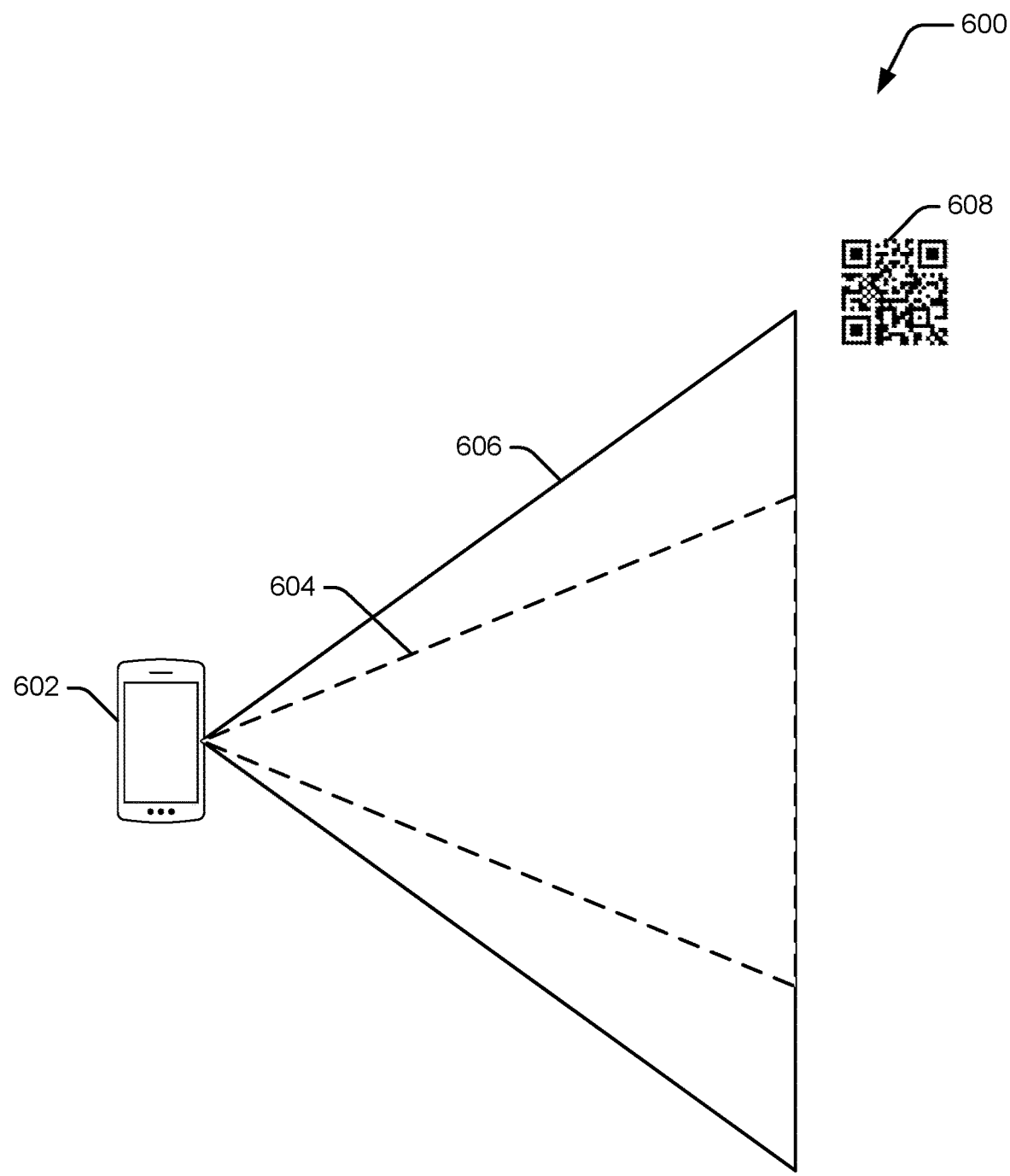

FIG. 6 illustrates an example 600 of a computing device 602 implementing the techniques discussed herein. The computing device 602 includes a wide angle camera system with a field of view 604 illustrated with dashed lines, and an ultra-wide angle camera system with a field of view 606 illustrated with solid lines. A QR code 608 is not within the field of view 604 of the wide angle camera system but is partially within the field of view 606 of the ultra-wide angle camera system. The barcode identification module 202 determines that a QR code is partially within the field of view 606 of the ultra-wide angle camera system but is not able to identify the entire QR code. Accordingly, the barcode identification module 202 outputs an alert 210 indicating a direction to move the computing device 102 so that the computing device 102 is within the field of view 604 or the field of view 606.

Returning to FIG. 2, the application 110 receives images 206 and can identify barcodes in the images 206. The application 110 takes one or more of a variety of different actions based on the camera selection 212 and the barcode in the preview images 206 generated by the selected camera. In one or more implementations, the application 110 displays a link (e.g., a uniform resource locator (URL) encoded in the barcode). The user can then take various actions, such as clicking on the link to access the resource (e.g., a web page) identified by the link.

Additionally or alternatively, the application 110 automatically accesses the resource (e.g., a web page) identified by a link (e.g., a URL) encoded in the barcode. This accessing may include, for example, opening a web page identified by the link. It should be noted that the application 110 can display the barcode and then automatically access the resource, or automatically access the resource without displaying the barcode.

Additionally or alternatively, the application 110 opens another application on the computing device 102 associated with the barcode. For example, the barcode may be associated with a payment application or a payment wallet, and the application 110 automatically opens that payment application or payment wallet.

Additionally or alternatively, the application 110 processes a payment, or prompts the user to confirm a payment, associated with the barcode. For example, the barcode may be associated with transmitting a particular amount of money to a merchant, and the application 110 automatically transmits that amount of money from the user's payment wallet to the merchant or prompts the user to permit transmitting that amount of money from the user's payment wallet to the merchant.

Returning to FIG. 1, the camera selection system 114 can be activated at any of a variety of different times. In one or more implementations, the camera selection system 114 is automatically activated when a camera application is launched or opened and remains activated for a duration of time, such as a threshold number of seconds (e.g., 10 seconds), until the camera application is closed, remains activated for as long as the camera application remains open, and so forth. The camera selection system 114 may be automatically activated in response to the camera application being opened in a particular mode, such as a service mode for barcode scanning purposes. The camera selection system 114 can determine that a camera application is opened in in service mode in various manners, such as determining that the camera application has been open for a threshold number of seconds (e.g., 5 or 10 seconds) without receiving a user input to capture an image.

Additionally or alternatively, the camera selection system 114 is automatically activated in response to another application that is associated with scanning barcodes is opened. Such an application may be, for example, a payment application or payment wallet.

Additionally or alternatively, the camera selection system 114 is activated in response to a command or request from a user of the computing device 102. For example, the user may request (e.g., via activation of an icon or widget, audible input, and so forth) to scan for barcodes, and the camera selection system 114 is activated in response to that request.

Figure 7:
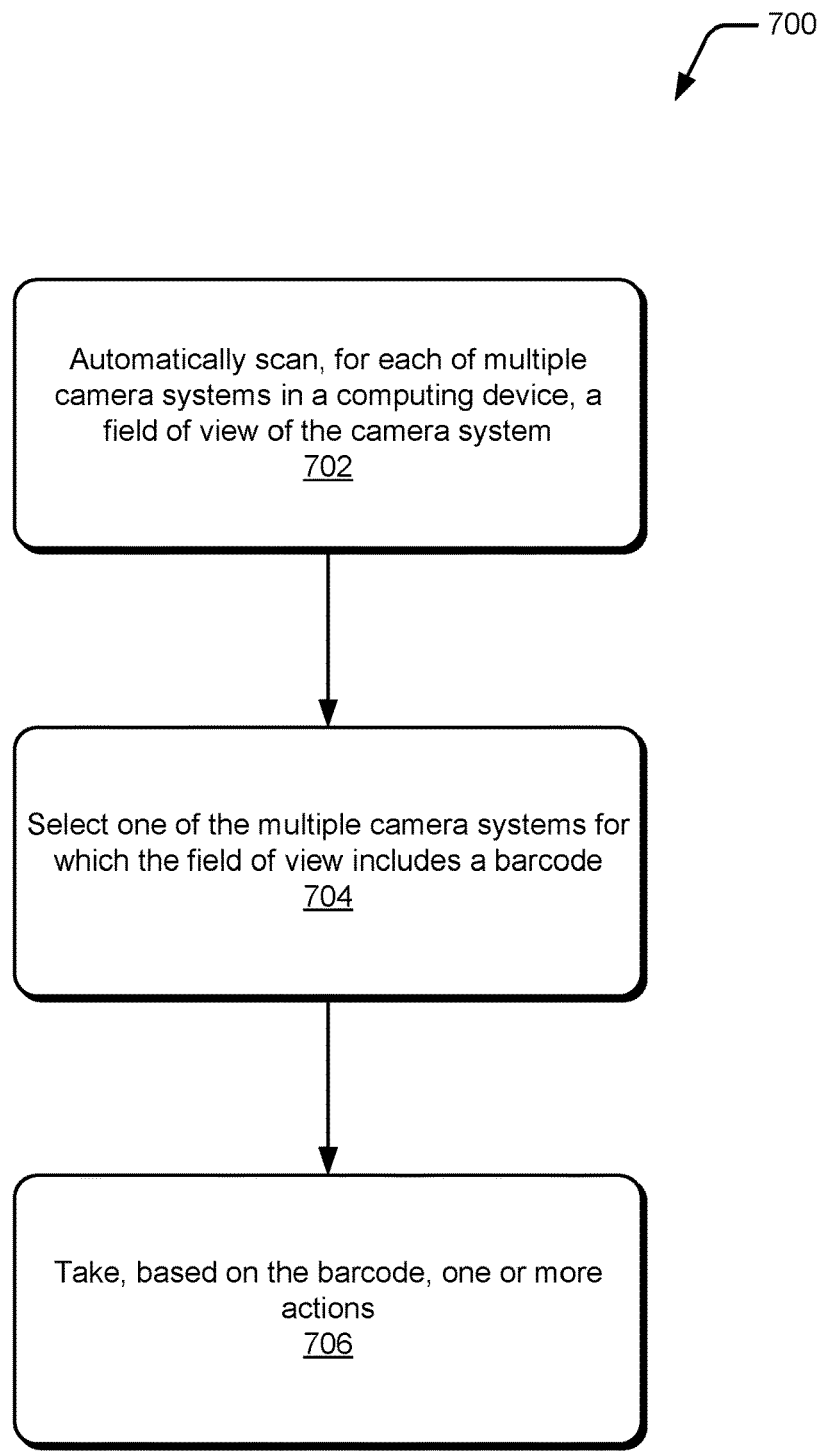
FIG. 7 illustrates an example process for implementing the techniques discussed herein in accordance with one or more embodiments.

FIG. 7 illustrates an example process 700 for implementing the techniques discussed herein in accordance with one or more embodiments. Process 700 is carried out by a camera selection system, such as camera selection system 114 of FIG. 1, and can be implemented in software, firmware, hardware, or combinations thereof. Process 700 is shown as a set of acts and is not limited to the order shown for performing the operations of the various acts.

In process 700, the fields of view of multiple camera systems are automatically scanned (act 702). Various camera systems can be used, such as telephoto, wide angle, ultra-wide angle, macro, and so forth camera systems.

One of the multiple camera system for which the field of view includes a barcode is selected (act 704). The barcode can be, for example, a 1-dimensional barcode or a QR code.

One or more actions are taken based on the barcode (act 706). Various actions may be taken, such as displaying the barcode, displaying information encoded in the barcode, launching or activating an application associated with the barcode, and so forth.

Figure 8:
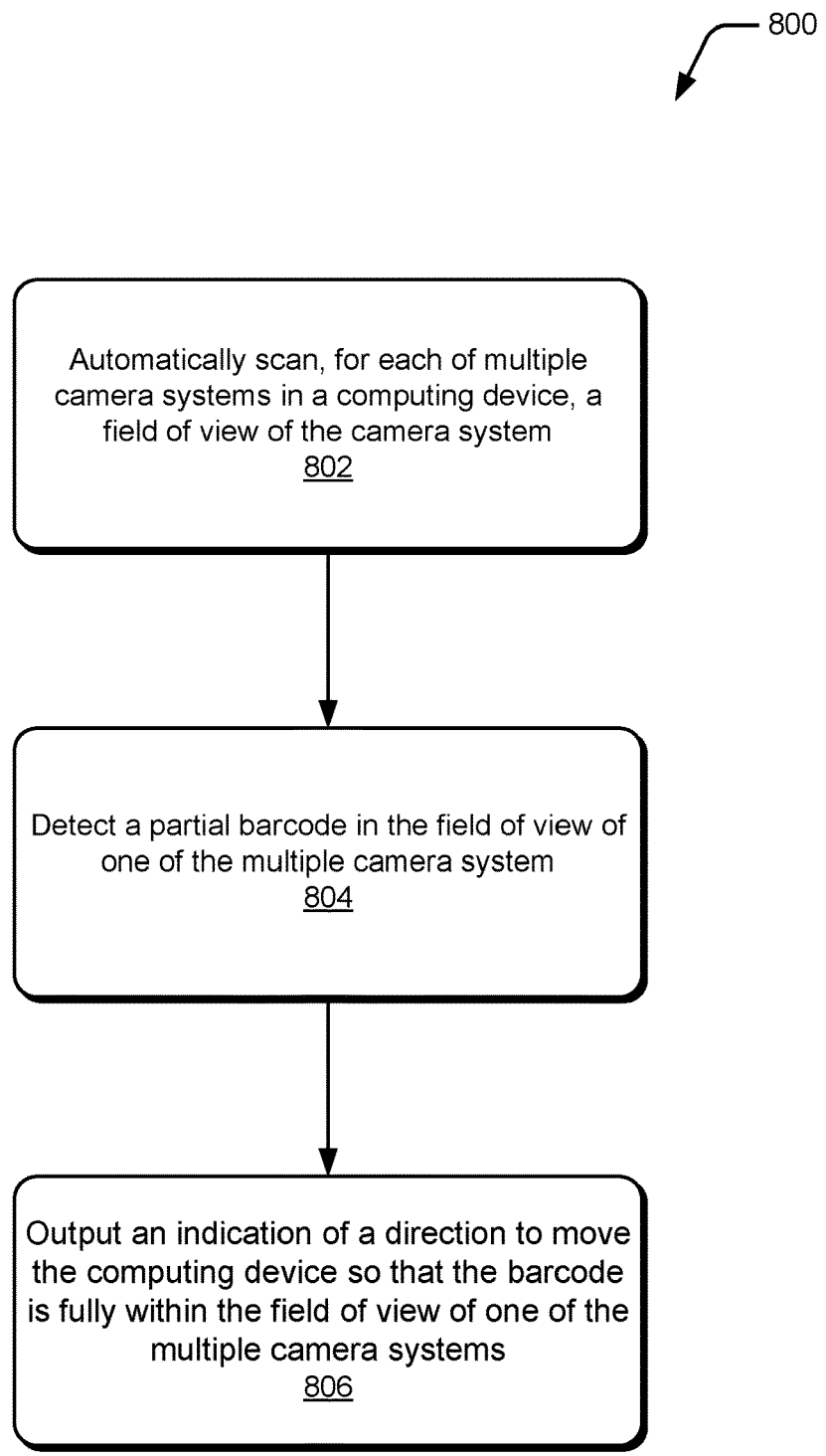
FIG. 8 illustrates another example process for implementing the techniques discussed herein in accordance with one or more embodiments.

FIG. 8 illustrates an example process 800 for implementing the techniques discussed herein in accordance with one or more embodiments. Process 800 is carried out by a camera selection system, such as camera selection system 114 of FIG. 1, and can be implemented in software, firmware, hardware, or combinations thereof. Process 800 is shown as a set of acts and is not limited to the order shown for performing the operations of the various acts.

In process 800, the fields of view of multiple camera systems are automatically scanned (act 802). Various camera systems can be used, such as telephoto, wide angle, ultra-wide angle, macro, and so forth camera systems.

A partial barcode is detected in the field of view of one of the multiple camera systems (act 804). The barcode can be, for example, a 1-dimensional barcode or a QR code.

An indication of a direction to move the computing device so that the barcode is fully within the field of view of one of the multiple camera systems is output (act 806). This indication can be output in various manners, such as a directional arrow indicating the direction to move the computing device, an audio output, and so forth.

Figure 9:
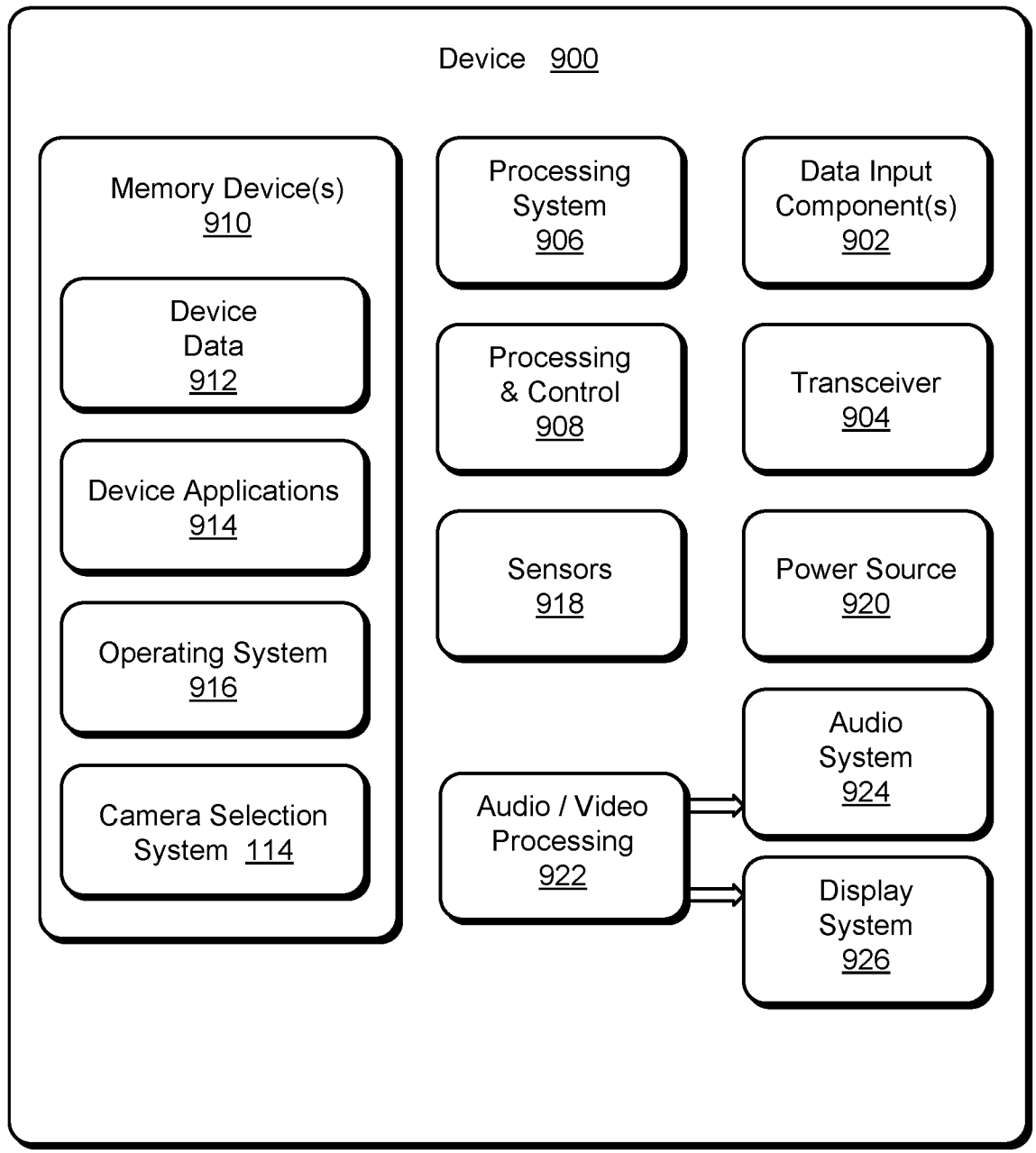
FIG. 9 illustrates various components of an example electronic device that can implement embodiments of the techniques discussed herein.

FIG. 9 illustrates various components of an example electronic device that can implement embodiments of the techniques discussed herein. The electronic device 900 can be implemented as any of the devices described with reference to the previous FIG.s, such as any type of client device, mobile phone, tablet, computing, communication, entertainment, gaming, media playback, or other type of electronic device. In one or more embodiments the electronic device 900 includes the camera selection system 114, described above.

The electronic device 900 includes one or more data input components 902 via which any type of data, media content, or inputs can be received such as user-selectable inputs, messages, music, television content, recorded video content, and any other type of text, audio, video, or image data received from any content or data source. The data input components 902 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 902 may also include various other input components such as microphones, touch sensors, touchscreens, keyboards, and so forth.

The device 900 includes communication transceivers 904 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 900 includes a processing system 906 of one or more processors (e.g., any of microprocessors, controllers, and the like) or a processor and memory system implemented as a system-on-chip (SoC) that processes computer-executable instructions. The processing system 906 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 908. The device 900 may further include any type of a system bus or other data and command transfer system that couples the various components within the device. A system bus can include any one or combination of different bus structures and architectures, as well as control and data lines.

The device 900 also includes computer-readable storage memory devices 910 that enable one or both of data and instruction storage thereon, such as data storage devices that can be accessed by a computing device, and that provide persistent storage of data and executable instructions (e.g., software applications, programs, functions, and the like). Examples of the computer-readable storage memory devices 910 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 900 may also include a mass storage media device.

The computer-readable storage memory device 910 provides data storage mechanisms to store the device data 912, other types of information or data, and various device applications 914 (e.g., software applications). For example, an operating system 916 can be maintained as software instructions with a memory device and executed by the processing system 906 to cause the processing system 906 to perform various acts. The device applications 914 may also include a device manager, such as any form of a control application, software application, signal-processing and control module, code that is native to a particular device, a hardware abstraction layer for a particular device, and so on.

The device 900 can also include one or more device sensors 918, such as any one or more of an ambient light sensor, a proximity sensor, a touch sensor, an infrared (IR) sensor, accelerometer, gyroscope, thermal sensor, audio sensor (e.g., microphone), and the like. The device 900 can also include one or more power sources 920, such as when the device 900 is implemented as a mobile device. The power sources 920 may include a charging or power system, and can be implemented as a flexible strip battery, a rechargeable battery, a charged super-capacitor, or any other type of active or passive power source.

The device 900 additionally includes an audio or video processing system 922 that generates one or both of audio data for an audio system 924 and display data for a display system 926. In accordance with some embodiments, the audio/video processing system 922 is configured to receive call audio data from the transceiver 904 and communicate the call audio data to the audio system 924 for playback at the device 900. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for barcode detection using a multi-camera system have been described in language specific to features or methods, the subject of the appended claims is not necessarily limited to the specific features or methods described. Rather, the specific features and methods are disclosed as example implementations of techniques for implementing barcode detection using a multi-camera system. Further, various different embodiments are described, and it is to be appreciated that each described embodiment can be implemented independently or in connection with one or more other described embodiments. Additional aspects of the techniques, features, and/or methods discussed herein relate to one or more of the following:

In some aspects, the techniques described herein relate to a method including: automatically scanning, for each of multiple camera systems in a computing device, a field of view of the camera system: selecting one of the multiple camera systems for which the field of view includes a barcode; and taking, based on the barcode, one or more actions.

In some aspects, the techniques described herein relate to a method, wherein the barcode includes a QR code.

In some aspects, the techniques described herein relate to a method, wherein the one or more actions including displaying a preview image received from the selected camera system, the preview image including the barcode.

In some aspects, the techniques described herein relate to a method, wherein the automatically scanning includes automatically scanning, for each of the multiple camera systems simultaneously, the field of view of the camera system.

In some aspects, the techniques described herein relate to a method, wherein each of the multiple camera systems includes a lens and a corresponding sensor.

In some aspects, the techniques described herein relate to a method, wherein one of the multiple camera systems comprises a macro camera system as well as a telephoto camera system or an ultra-wide camera system.

In some aspects, the techniques described herein relate to a method, wherein the multiple camera systems include a telephoto camera system with a smallest field of view, an ultra-wide camera system with a largest field of view, and a wide camera system with a field of view in between the smallest field of view and the largest field of view.

In some aspects, the techniques described herein relate to a method, wherein the multiple camera systems include a first camera system having a first focus range and a second camera system having a second focus range that is a closer focus range than the first focus range.

In some aspects, the techniques described herein relate to a method, further including: detecting a partial barcode in the field of view of one of the multiple camera system; and outputting an indication of a direction to move the computing device so that the barcode is fully within the field of view of one of the multiple camera systems.

In some aspects, the techniques described herein relate to a computing device including: a processor implemented in hardware: multiple camera systems; a computer-readable storage memory having stored thereon multiple instructions that, responsive to execution by the processor, cause the processor to perform acts including: automatically scanning, for each of the multiple camera systems, a field of view of the camera system: selecting one of the multiple camera systems for which the field of view includes a barcode; and taking, based on the barcode, one or more actions.

In some aspects, the techniques described herein relate to a computing device, wherein the automatically scanning includes automatically scanning, for each of the multiple camera systems simultaneously, the field of view of the camera system.

In some aspects, the techniques described herein relate to a computing device, wherein each of the multiple camera systems includes a lens and a corresponding sensor.

In some aspects, the techniques described herein relate to a computing device, wherein the multiple camera systems include a telephoto camera system with a smallest field of view, an ultra-wide camera system with a largest field of view, and wide camera system with a field of view in between the smallest field of view and the largest field of view.

In some aspects, the techniques described herein relate to a computing device, wherein the multiple camera systems include a first camera system having a first focus range and a second camera system having a second focus range that is a closer focus range than the first focus range.

In some aspects, the techniques described herein relate to a computing device, the acts further including: detecting a partial barcode in the field of view of one of the multiple camera system; and outputting an indication of a direction to move the computing device so that the barcode is fully within the field of view of one of the multiple camera systems.

In some aspects, the techniques described herein relate to a system including: a barcode identification module, implemented at least in part in hardware, to automatically scan, for each of multiple camera systems in a computing device, a field of view of the camera system; and a camera selection module, implemented at least in part in hardware, to select one of the multiple camera systems for which the field of view includes a barcode and output an indication of the selected camera system.

In some aspects, the techniques described herein relate to a system, further including a processor executing instructions to take, based on the barcode, one or more actions.

In some aspects, the techniques described herein relate to a system, wherein the barcode identification module is to automatically scan, for each of the multiple camera systems simultaneously, the field of view of the camera system.

In some aspects, the techniques described herein relate to a system, wherein each of the multiple camera systems includes a lens and a corresponding sensor.

In some aspects, the techniques described herein relate to a system, wherein the multiple camera systems include a telephoto camera system with a smallest field of view, an ultra-wide camera system with a largest field of view, and wide camera system with a field of view in between the smallest field of view and the largest field of view.

In some aspects, the techniques described herein relate to a system, wherein the multiple camera systems including a first camera system having a first focus range and a second camera system having a second focus range that is a closer focus range than the first focus range.

What is claimed is:

1. A method comprising:
automatically scanning for a barcode using multiple camera systems in a computing device, the multiple camera systems having different fields of view for capturing images;
capturing preview frames of the different fields of view using the multiple camera systems;
identifying a partial barcode in a field of view of at least one of the multiple camera systems by determining the partial barcode is present in at least one of the preview frames;
automatically selecting the at least one of the multiple camera systems having the field of view that includes the partial barcode;
outputting directions including an indication of a direction to move the computing device so that a barcode corresponding to the partial barcode is fully within the field of view of at least one of the preview frames; and
taking one or more actions with the at least one of the multiple camera systems based on the barcode.

2. The method of claim 1, wherein the barcode comprises a quick response (QR) code.

3. The method of claim 1, further comprising displaying a preview image received from the selected camera system, the preview image including the barcode.

4. The method of claim 1, wherein the automatically scanning comprises automatically scanning, for each of the multiple camera systems simultaneously, the preview frames of the different fields of view.

5. The method of claim 1, wherein each of the multiple camera systems comprises a lens and a corresponding sensor.

6. The method of claim 5, wherein one of the multiple camera systems comprises a macro camera system as well as a telephoto camera system or an ultra-wide camera system.

7. The method of claim 1, wherein the multiple camera systems include a telephoto camera system with a smallest field of view, an ultra-wide camera system with a largest field of view, and a wide camera system with a field of view in between the smallest field of view and the largest field of view.

8. The method of claim 1, wherein the multiple camera systems include a first camera system having a first focus range and a second camera system having a second focus range that is a closer focus range than the first focus range.

9. The method of claim 1, wherein the indication of the direction to move the computing device includes directions for framing the barcode in the field of view of the at least one of the multiple camera systems.

10. The method of claim 1, wherein the barcode is not in the field of view of another of the multiple camera systems.

11. The method of claim 1, wherein the direction include an arrow indicating the direction to move the computing device.

12. A computing device comprising:
a processor implemented in hardware;
multiple camera systems; and
a computer-readable storage memory having stored thereon multiple instructions that, responsive to execution by the processor, cause the processor to perform acts including:
automatically scanning for a barcode using the multiple camera systems, the multiple camera systems having different fields of view for capturing images;
capturing preview frames of the different fields of view using the multiple camera systems;

identifying a partial barcode in a field of view of at least one of the multiple camera systems by determining the partial barcode is present in at least one of the preview frames;

automatically selecting at least one of the multiple camera systems having the field of view that includes the partial barcode;

outputting directions including an indication of a direction to move the computing device so that a barcode corresponding to the partial barcode is fully within the field of view of at least one of the preview frames; and taking one or more actions with the at least one of the multiple camera systems based on the barcode.

13. The computing device of claim 12, wherein the automatically scanning comprises automatically scanning, for each of the multiple camera systems simultaneously, the preview frames of the different fields of view.

14. The computing device of claim 12, wherein the multiple camera systems include a first camera system having a first focus range and a second camera system having a second focus range that is a closer focus range than the first focus range.

15. The computing device of claim 12, wherein the indication of the direction to move the computing device includes directions for framing the barcode in the field of view of the at least one of the multiple camera systems.

16. A system comprising:
a barcode identification module, implemented at least in part in hardware, to:
automatically scan for a barcode using multiple camera systems in a computing device, the multiple camera systems having different fields of view for capturing images;
capture preview frames of the different fields of view using the multiple camera systems; and
identify a partial barcode in a field of view of at least one of the multiple camera systems by determining the partial barcode is present in at least one of the preview frames; and a camera selection module, implemented at least in part in hardware, to:
automatically select at least one of the multiple camera systems having the field of view that includes the partial barcode;
output directions including an indication of a direction to move the computing device so that a barcode corresponding to the partial barcode is fully within the field of view of at least one of the preview frames; and
output an indication of the selected camera system.

17. The system of claim 16, further comprising a processor executing instructions to take, based on the barcode, one or more actions.

18. The system of claim 16, wherein the barcode identification module is to automatically scan, for each of the multiple camera systems simultaneously, the preview frames of the different fields of view.

19. The system of claim 16, wherein each of the multiple camera systems comprises a lens and a corresponding sensor.

20. The system of claim 16, wherein the multiple camera systems including a first camera system having a first focus range and a second camera system having a second focus range that is a closer focus range than the first focus range.

* * * * *